United States Patent [19]

Bartlett, Jr. et al.

[11] 4,200,394

[45] Apr. 29, 1980

[54] HOLOGRAM TECHNIQUE FOR ESTABLISHING THE INTEGRITY OF PACKAGES

[75] Inventors: Oliver H. Bartlett, Jr., Simpsonville; Charles B. Izard, Adelphi, both of Md.

[73] Assignee: The United States of America as represented by the Secretary of the Army, Washington, D.C.

[21] Appl. No.: 106,277

[22] Filed: Jan. 13, 1971

[51] Int. Cl.$^2$ .......................... G01B 9/02; G01M 3/00
[52] U.S. Cl. ......................................... 356/347; 73/52; 356/348; 356/359
[58] Field of Search ............... 356/156, 163, 168, 171, 356/237, 256, 109, 110, 32, 347, 348, 359; 73/52, 88 A, 762; 116/203

[56] References Cited

U.S. PATENT DOCUMENTS

| | | | |
|---|---|---|---|
| 2,294,897 | 9/1942 | Ellis | 73/88 A |
| 3,563,652 | 2/1971 | Powell et al. | 356/32 |
| 3,619,064 | 11/1971 | Brooks et al. | 356/109 |
| 3,631,711 | 1/1972 | Kreuzer | 356/109 |

*Primary Examiner*—S. C. Buczinski
*Attorney, Agent, or Firm*—John R. Utermohle

[57] ABSTRACT

A technique for detecting whether a package has been tampered with or altered. A package is first coated with a transparent material, such material having bubbles or particles of random size and/or spacing trapped within it. A hologram is then made of the package with the bubbled coating, showing the spacial relationship of the surface of the package and the bubbled coating. At the destination of the package, the package is viewed through the hologram to detect any change in the spacial relationship between the package surface and the bubbled coating. Any such change in the spacial relationship would indicate that the package had been tampered with or altered.

14 Claims, No Drawings

HOLOGRAM TECHNIQUE FOR ESTABLISHING THE INTEGRITY OF PACKAGES

BACKGROUND OF THE INVENTION

The present invention relates to package security, and more particularly to the art of coating objects to provide an indication as to whether the object has been tampered with. In recent years, and with the expansion of knowledge of methods of analysis, alteration of packages and objects has become more and more difficult to detect. The problem presented by an inability to detect alteration of packages which contain important documents or objects or documents of a classified nature is obvious. It is vital that the recipient of the documents or object be certain that such objects or documents have not been tampered with subsequent to their leaving the originator.

Over the years a number of techniques of increasing complexity have been developed to combat methods of tampering with packages and envelopes. One such technique utilizes dyes or other materials inclosed in an encasement which covers the object, the dyes or material changing colors on exposure to the air. This change of color provides a visual indication that packages or documents have been tampered with to the extent that the encasement has been damaged sufficiently to expose the dye.

Other techniques shown by the prior art include the use of wax seals or strings affixed to packages in a rigid manner, such seals and/or strings being ruptured if the package is tampered with. Increasing sophistication in the art of tampering has proven many of these techniques to be currently unreliable. Wax seals and strings, of course, may easily be replaced so as to give an appearance that the package has never been tampered with. It is also possible to duplicate encasements containing dye or the like, after they have once been tampered with and subsequently removed from the package. Additionally, the encasement type of protection often proves to be too bulky, too time consuming, and too expensive to implement on a large scale.

The present invention solves these problems of the prior art by providing a method by which an object is coated with a material containing some type of inconsistency. When a hologram is subsequently made of the coated object, it is possible to identify a spacial relationship between the coating and the object to a very close tolerance, a tolerance that cannot be duplicated with present day techniques.

SUMMARY OF THE INVENTION

An object of the present invention is to provide a new and improved method for insuring the integrity of packages.

Another object of the present invention is to provide a method by which hologram techniques may be used to insure the integrity of packages.

A further object of the invention is to provide a new and improved method for insuring the integrity of packages by coating the packages with a clear material having inconsistencies therein.

The present invention relates generally to a method of insuring the integrity of packaging by coating an object in some fashion with a transparent material and then making a hologram of the coated object. The hologram of the coated object is then compared with the object at the destination of the object to ascertain whether such object has been tampered with subsequent to its being coated. More particularly, the invention relates to a method of insuring the integrity of packages by which an object to be protected is coated in some fashion with a transparent material, the material having bubbles or particles of some kind randomly present. A hologram is then made of the coated object, the hologram showing the particular spacial relationship between the surface of the object and the visible bubbles or particles present in the transparent material. At the destination of the object, the coated object is viewed through the appropriate hologram. Any distortion or difference in the spacial relationship between the surface of the object and the particles or bubbles in the coating would be visible. Such difference or distortion in the spacial relationship would indicate that the object has been tampered with, damaged, or altered in some fashion. The present invention thus discloses a reliable and nonduplicateable method for insuring the integrity of packages and documents.

DESCRIPTION OF THE PREFERRED EMBODIMENT

The present invention is a method of coating objects by which an accurate indication may be obtained regarding the physical integrity of the object. In a typical application, it may be necessary to transport a container from one place to another without compromise of its contents. In such an application, it is essential that the recipient of the container be able to ascertain whether the container has been physically compromised in any way. The technique described in the following paragraphs presenting the preferred embodiment of the invention achieves such results.

In the preferred embodiment, the container to be protected is a rigid, non-deformable container. It is desirable that the container be rigid, so that the recipient be able to identify deformations in the surface of the container as the result of actual tampering and not because of normal bending that a non-rigid object might experience. The surfaces of the container to be protected must have a texture that has visible physical peculiarities or inconsistencies in it. It is desirable to prepare the container to be protected so that the surface areas to be covered have a roughened texture. It is only necessary to roughen the surface to the extent required to distinguish it over a mirror type finish and to provide a surface which is capable of a substantial bond with the coating material. The entire surface area of the container may be so prepared or only prescribed areas, such as sealed areas, depending on how much coating is desirable in a particular case. Any standard, conventional method of surface roughening is appropriate. A metal surface which is etched or scraped are examples of correct surface preparation.

The container or surface area to be verified is then coated with a transparent material, for instance, a thermal setting plastic or other durable clear material known in the art. The material must be transparent to the extent that inconsistencies within the material and the surface of the container are visible. The coating material must have been previously processed, by appropriate mixing or through addition of ingredients, so that bubbles or particles of random size and/or spacing are trapped within the coated material. This suspension of bubbles or particles in the material may be accomplished by well known conventional methods. The bubbles or small particles must be of a random nature, both in size and spacing and must be clearly visible in the coating material. The surface texture of the container and the relationship of the texture to the random bubbles or particles trapped within the coated material must be clearly visible. The coating may be accomplished by any conventional means, including spraying, dipping or brushing, or moulding.

The coating is then dried or aged by some conventional means to a rigid, non-deformable coating. The container is thus encased or covered in the designated area with a rigid material. The bubbles and/or particles trapped in the sealant material are stabilized as the material sets in such a manner that a permanent spacial physical relationship is established between the surface texture of the container and the bubbles or particles trapped within the sealant material. A conventional hologram is then made of the appropriate surfaces of the container, the hologram showing the precise physical relationship between the roughened surface of the container, and the random bubbles or particles which are permanently suspended in the clear plastic coated material.

In the preferred embodiment, the appropriate holograms of the surfaces of the container are sent by a secure route to the ultimate destination of the coated container. The container itself is then sent to the desired location by a separate route after the holograms of the container have been received. The recipient thus has in his possession the holograms taken of the surfaces of the container before the container itself arrives. When the container does arrive, the hologram and the container are set in an optical system which is physically identical to the optical system in which the hologram was originally made. This system is then used to view the surfaces of the container through the appropriate hologram.

The correct physical alignment between the hologram and the container may be attained by mechanical and optical alignment procedures. Conventional mechanical procedures will provide a "coarse" physical adjustment of the hologram in the system. Conventional optical techniques are then used to provide a fine physical adjustment to a physical tolerance on the order of a micron. When the surfaces of the object are viewed through their appropriate holograms in such an optical system, a defraction pattern is visible which shows any change in the surface of the object. Any distortion or difference in the spacial relationship between the surfaces of the container and the encased bubbles or particles will be visible. Physical distortions on the order of 1500 Angstroms are visible by using present holographic techniques. Such identifiable distortion in the spacial relationship is an accurate indication that the container and/or the surface coating of the container has been tampered with or damaged in some way. By using a technique which can identify small quantities of physical distortion, the possibilities of duplication after the container has been tampered with are significantly decreased.

The above description is of a preferred embodiment of the invention, and numerous modifications may be made thereto without departing from the spirit and the scope of the invention. For instance, several different techniques may be utilized in conjunction with a clear plastic coating to give the required spacial relationship between inconsistencies in the coating and the surfaces of the container.

What is claimed is:

1. A method for detecting whether a package has been tampered with, comprising the steps of:
    coating an object with a transparent material, said material having visible inconsistencies trapped therein;
    making a hologram of said coated object, and
    viewing said coated object through said hologram to detect any change in the spacial relationship between a surface of the object and said coating.

2. A method for detecting whether a package has been tampered with in accordance with claim 1, wherein said visible inconsistencies are bubbles trapped within said material.

3. A method for detecting whether a package has been tampered with in accordance with claim 1, wherein said visible inconsistencies are particles of matter trapped within said material.

4. A method for detecting whether a package has been tampered with in accordance with claim 1, wherein said visible inconsistencies are bubbles and particles of matter trapped within said material.

5. A method for detecting whether a package has been tampered with in accordance with claim 4, wherein said visible inconsistencies are trapped within said material in a permanent relationship to one another after coating said object with said material.

6. A method for detecting whether a package has been tampered with in accordance with claim 5, wherein said visible inconsistencies trapped within said material are of a random size.

7. A method for detecting whether a package has been tampered with in accordance with claim 5, wherein said visible inconsistencies trapped within said material are of a random spacing.

8. A method for detecting whether a package has been tampered with in accordance with claim 5, wherein the step of coating includes coating said object with material having visible inconsistencies of random size and spacing trapped within it.

9. A method for detecting whether a package has been tampered with in accordance with claim 8, which includes the step of roughening the surfaces of the objects to be coated.

10. A method for detecting whether a package has been tampered with in accordance with claim 9, wherein the step of coating an object includes coating a rigid object with a transparent material.

11. A method for detecting whether a package has been tampered with in accordance with claim 10, wherein the step of making a hologram includes making a hologram on rigid material.

12. A method for detecting whether a package has been tampered with in accordance with claim 11, wherein the step of coating an object includes coating an object with a material of sufficient transparency to define a spacial relationship between the surface of said object and said visible inconsistencies trapped therein.

13. A method for detecting whether a package has been tampered with in accordance with claim 12, including the step of physically aligning the hologram with said object to view said object by mechanical and optical procedures.

14. A method for detecting whether a package has been tampered with in accordance with claim 13, wherein the step of coating includes coating said object with a non-deformable plastic material.

* * * * *